(No Model.) 2 Sheets—Sheet 1.
J. E. RICHARD.
BICYCLE.
No. 252,624. Patented Jan. 24, 1882.
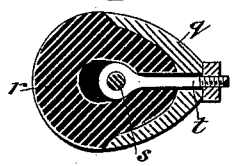
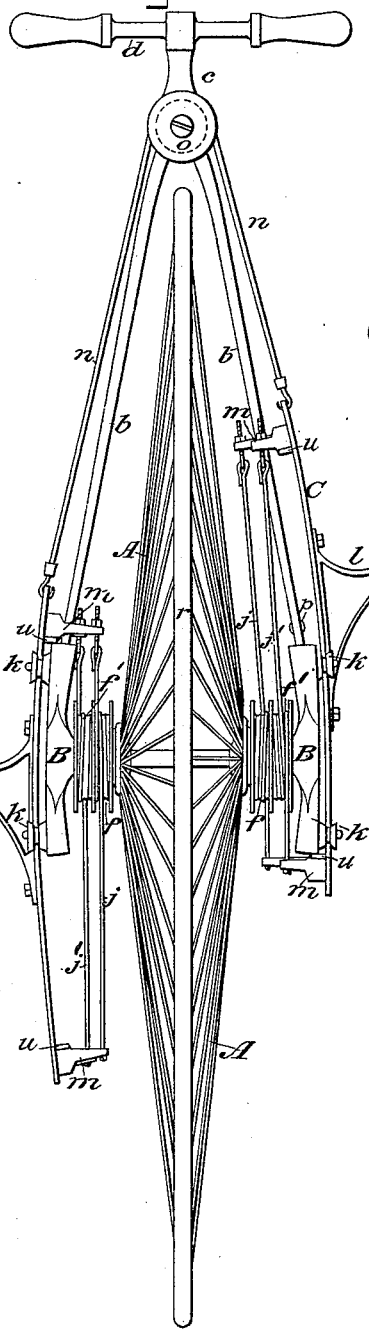
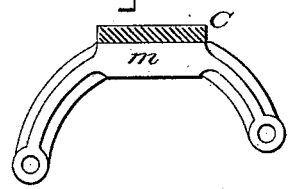
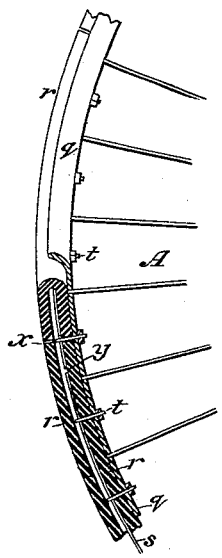
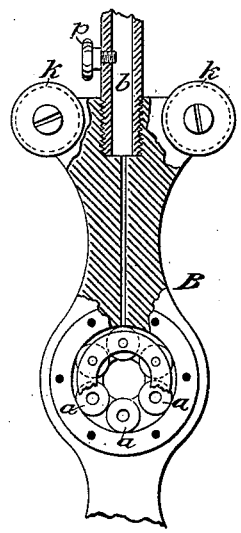
WITNESSES:
E. B. Bolton
Geo. Bainton
INVENTOR:
Jean E. Richard
By his Attorneys,
Burke, Fraser & Connett (No Model.)  2 Sheets—Sheet 2.

J. E. RICHARD.
BICYCLE.

No. 252,624. Patented Jan. 24, 1882.

WITNESSES:
E. B. Bolton
Geo. Bainton

INVENTOR:
Jean E. Richard
By his Attorneys,
Burke, Fraser & Connett

UNITED STATES PATENT OFFICE.

JEAN E. RICHARD, OF NEW YORK, N. Y.

BICYCLE.

SPECIFICATION forming part of Letters Patent No. 252,624, dated January 24, 1882.

Application filed May 28, 1881. (No model.)

*To all whom it may concern:*

Be it known that I, JEAN E. RICHARD, a citizen of the United States, residing in the city, county, and State of New York, have invented certain new and useful Improvements in Bicycles and Similar Vehicles, of which the following is a specification.

This invention relates in the main to the propelling mechanism of a bicycle, whereby alternate reciprocating movements of the feet impart rotary motion to the main or driving wheel.

Another feature of the invention relates to the mode of constructing and attaching a tubular rubber tire or tread to the wheel, all as will be more fully hereinafter set forth.

Figure 2:
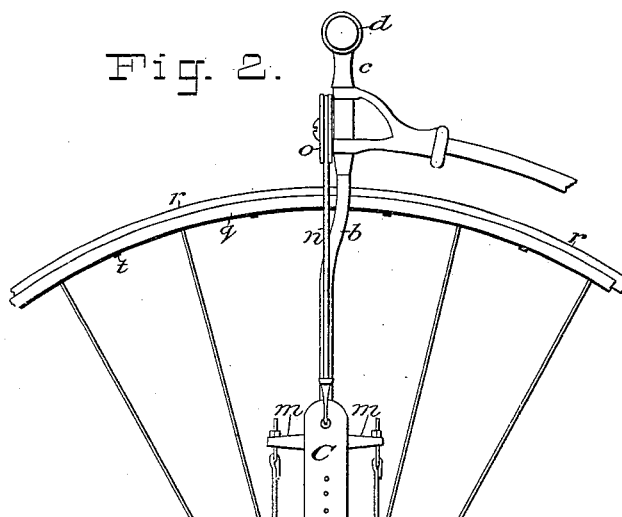
Figure 8:
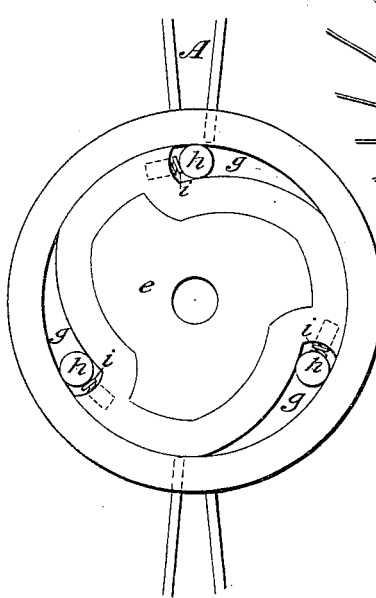
Figure 9:
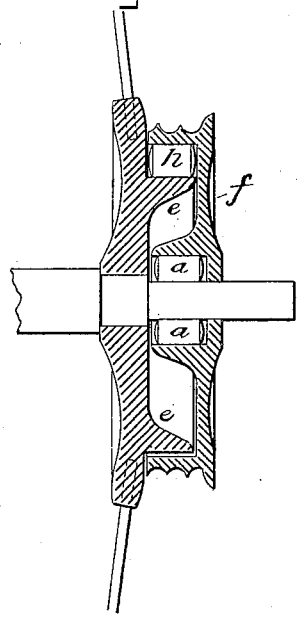
Figure 4:
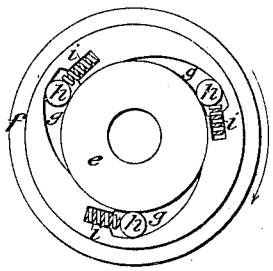

In the drawings, which serve to illustrate my invention, Figure 1 is a front elevation of a bicycle provided with my improvements; and Fig. 2 is a side view of the same, showing only those parts containing my improvements. Figs. 3, 4, and 5 are detached views on a larger scale, which will be referred to more particularly hereinafter. Fig. 6 is a view showing the rubber tire and mode of attaching it, and Fig. 7 is a cross-section of the same enlarged. Figs. 8 and 9 are views illustrating a modification which will be fully described hereinafter.

Let A represent the main or driving wheel of a bicycle of the usual pattern. The axle of this wheel has bearings in plates or boxes B B, provided with steel friction-rollers $a\ a$, as indicated in Fig. 5, which is a sectional view of said plate. In the upper ends of the boxes are screwed the tubular branches $b\ b$, which form the fork, and which unite to form the vertical spindle $c$, to which the steering-handle $d$ is secured. The wheel is rotated through the medium of friction-clutches actuated by means of cords connected with reciprocating parts operated by the feet, and as the mechanisms on both sides of the wheel are alike a description of one will be sufficient.

On the axle of the driving-wheel, between the hub of said wheel and the box B, is fixed a cylindrical boss, $e$, (shown in Fig. 4,) and mounted on this boss are two drums, $f\ f'$, separated only by a thin washer or partition. These drums are precisely alike, and the one shown in Fig. 4 may be taken to represent both. In each of these drums or casings are formed one or more—preferably three—cam-shaped or wedge-shaped recesses, $g\ g$, in which are placed rollers or blocks $h\ h$, arranged to be pressed or wedged toward the narrow ends of said recesses $g$ by means of springs $i$. Thus as the rollers $h$ bear on the periphery of the boss $e$, and rest between said periphery and the inclined wall of the recess $j$, it will readily be seen that while the drum will turn freely around the boss in one direction, any attempt to turn it in the other direction (see arrow in Fig. 4) will cause the rollers to wedge themselves in the narrow parts of their recesses, between the drum and the boss, and thus form a friction-clutch by which the boss and the axle to which it is secured are rotated.

To rotate the drums $f$, I prefer to employ wire ropes or cords $j\ j'$, which pass around them and rest, by preference, in spiral grooves cut therein, so as to prevent one strand from overriding or chafing that adjacent.

Arranged to play longitudinally between guide-sheaves $k\ k$ on the outer face of the box B is a plate or bar, C, preferably slightly curved and bearing a bracket, $l$, for the foot to rest on. To each end of this plate C is secured a provision, $m$, (see Fig. 3,) having one long and one short branch or arm, and to these arms are attached the ends of the cords $j\ j'$, which are secured at their middles to the drums $f\ f'$. The cord $j$ is secured to the longer branches of the provision $m$ and the inner drum $f$. The other cord is attached to the outer drum. One cord is wound around its drum in one direction and the other in the opposite direction, whereby a continuous rotation of the driving-wheel A is effected by the reciprocation or longitudinal movement up and down of the bar C.

As before stated, the mechanisms for rotating the wheel are the same on both sides, and as the power is applied only by the downward pressure of the foot on each side, I prefer to connect the two mechanisms by means of a cord or wire rope, $n$, which passes over a sheave, $o$, above the wheel and is attached to the ends of the bars C. Thus it will be seen that a downward pressure of the feet of the rider alternately imparts continuous rotation to the driving-wheel A.

It will be seen by referring to Fig. 1 that the bars C are curved or bent outwardly and reciprocate in curved lines. The object of this is in part to bring their ends in nearer to the plane of the drums $f$ and in part because of the convergency of the fork $b$. It is important that the ends of the cord $n$, which converge toward the sheave $o$, should pull in a nearly straight line and that the lower extremities of the bars C should not project too much laterally; hence the curvature, which causes them to draw in when pressed down.

In the drawings the circumference of the drum $f$ is about equal to the stroke or distance through which the foot passes; but this proportion may be varied if desired.

By employing two drums and cords on each side I am enabled to apply power at both ends of the axle simultaneously and at all times; but this is not absolutely necessary. I may employ but one drum or cord on a side, in which case the cord $n$ would only serve to lift the parts on one side as those on the opposite side are being depressed.

In Figs. 8 and 9 I have shown a modification of the drum and inclosed boss, where but one drum and cord on a side are to be employed. In this case the boss $e$ is formed on the outer face of the wheel-hub, and the recesses $g$ for the friction blocks or rollers $h$ are formed in said boss instead of in the drum $f$, and the rollers press outwardly in clutching against the rim of the drum. I have also in Fig. 9 shown friction-rollers $a$ $a$ arranged in the drum around the axle-journal.

In applying my invention to bicycles of the ordinary kind I construct a boss similar to that shown in Figs. 8 and 9, and secure it to the flat face of the wheel-hub by screws. The other parts may then be added, as hereinbefore described.

Referring to Fig. 5, $p$ is a screw-plug arranged to close an aperture in the tubular branch of the fork a little distance above the box B. At this aperture oil may be inserted for lubrication, an oil-passage being formed by drilling to connect the socket in the box with the bearing in the same. I thus utilize the tubular branch of the fork and the socket into which it is screwed as an oil cup or receptacle.

In lieu of the cords arranged to wind and unwind on and from the drums $f\,f'$, I may employ a toothed rack or racks on the reciprocating bar, arranged to mesh with teeth on said drums; but I prefer the construction shown as the strongest and least liable to disarrangement.

A suitable brake may be employed in the usual way to check the momentum of the bicycle in stopping.

The brackets $l$ for the feet are made adjustable up and down on the bars C, so as to adapt them to different-sized riders. This may be done by providing a series of screw-holes in the bars to receive the screws or bolts which attach the bracket, as indicated in Fig. 2.

The bosses $e$ may be regarded as parts of the axle; but I find it more convenient to make them separately and secure them to the axle.

The ordinary rubber tire for a bicycle is made in one piece, or endless, and when worn, cut, or in any way injured at one point must be discarded, as, if not endless, they cannot be kept on, as the cement gives way. My improvement is designed to obviate this difficulty by employing a tubular tire, through which a wire is passed, said wire passing through eyes in the heads of small bolts in the wheel-rim, said heads being passed through small holes in the tubular tire on the side next the rim. I have shown this construction in Figs. 6 and 7, wherein $q$ represents a deep concave wheel-rim, and $r$ a tubular tire of rubber. Through the bore of the tire is passed a wire or rod, $s$, preferably of steel, which is also passed through eyes in the heads of securing-bolts $t$, which pass into the hollow of the tire, and are provided with nuts whereby the tire is drawn down tightly into the hollow of the rim, thus holding the tire firmly in place. I prefer to employ a bolt between each spoke of the wheel, but more or less may be employed. Where there is a joint in the tire, as there may be, the wire should be made to extend over it, as in Fig. 6, where the joint in the tire is shown at $x$ and that in the wire at $y$. This construction enables me to employ a tire made up of sections, and to take out and replace a section should it be worn or cut in use; and it effectually prevents the tire from getting loose in whole or in part, which is sure to throw the rider.

I am aware that velocipedes employing clutches and ratchets to rotate the driving-wheels by means of pedals and other devices are not new, and that it is not new to extend a wire through a rubber tire. Therefore I do not wish to claim these broadly; but I am not aware that the construction and arrangement of parts herein shown has ever before been known.

Having thus described my invention, I claim—

1. The combination, in a bicycle, of the following-named coacting elements—that is to say: the main driving-wheel fixed on an axle between the branches $b$ $b$ of the fork, the said fork having its branches socketed in elongated bearing-boxes B B, the said boxes arranged to form bearings for the ends of the axle, the drums $f\,f\,f'\,f'$, arranged in pairs on the axle between the driving-wheel and the boxes B B, and provided with internally-arranged clutches, as shown, the cords $j\,j'$, arranged on the drums and secured thereto, and secured also to the reciprocating bars C C, and the said reciprocating bars provided with brackets for the feet, all arranged as set forth, whereby the clutches act upon both ends of the driving-wheel shaft simultaneously to rotate the driving-wheel, as specified.

2. The combination, in a bicycle having its driving-wheel arranged to be rotated by means of clutches and drums on its axle through the medium of cords and reciprocating bars, of the said driving-wheel and the clutches, drums, and operative cords, with the bearing-boxes B B, sheaves k k, covered bars C C, provided with provisions m m, having arms of unequal length, cord or rope n, sheave o, and adjustable brackets l l, all arranged to operate substantially as and for the purposes set forth.

3. The combination, in a bicycle wherein the main or driving wheel is rotated by means of reciprocating bars, of the bearing-boxes B, keeper-sheaves k, curved bar C, provided with brackets for the feet and provisions m for attachment of the cords, and the rubber pads u u, all arranged to operate as and for the purposes set forth.

4. The combination, with the concave rim of a bicycle-wheel, of the tubular rubber tire r, the wire or rod s, and the securing-bolts t, provided with heads having eyes through which the said wire passes and with nuts to draw the tire closely into the concavity of the rim, all arranged to operate substantially as set forth.

5. As a means of attaching a tubular tire to a bicycle or similar vehicle, bolts with eyes or holes in their heads arranged in the concave rim of the wheel, and a wire or rod arranged to pass through said eyes in the bolt-heads inside of the tire, substantially as set forth.

In witness whereof I have signed my name in the presence of two subscribing witnesses.

JEAN E. RICHARD.

Witnesses:
HENRY CONNETT,
ARTHUR C. FRASER.